Feb. 6, 1923.

L. P. CARHART.
TRANSMISSION.
FILED AUG. 25, 1920

Inventor
Linden P. Carhart.
By Attorney

Feb. 6, 1923. 1,443,976
L. P. CARHART.
TRANSMISSION.
FILED AUG. 25, 1920. 2 SHEETS-SHEET 2
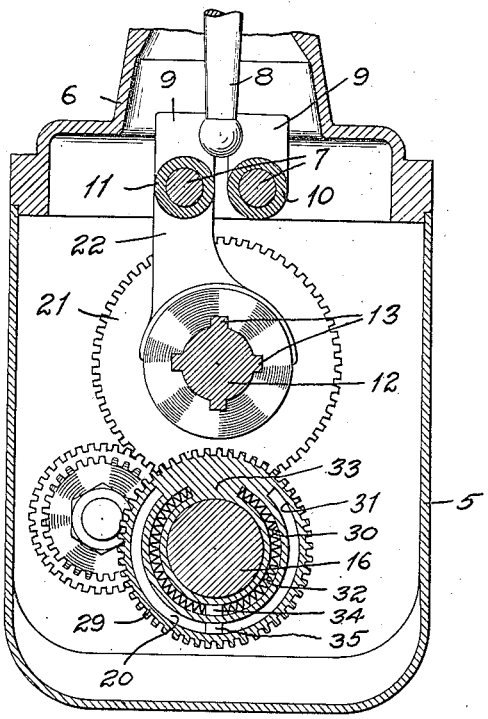
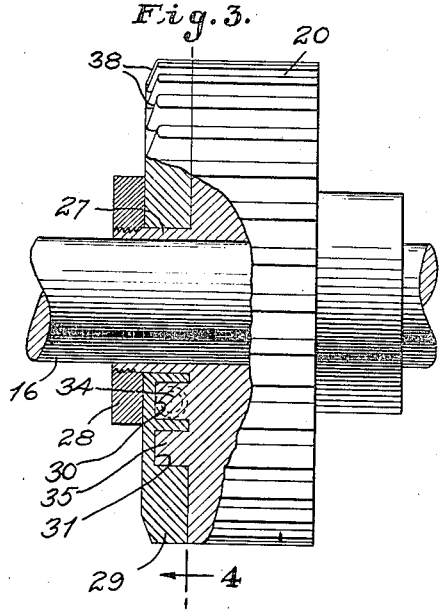
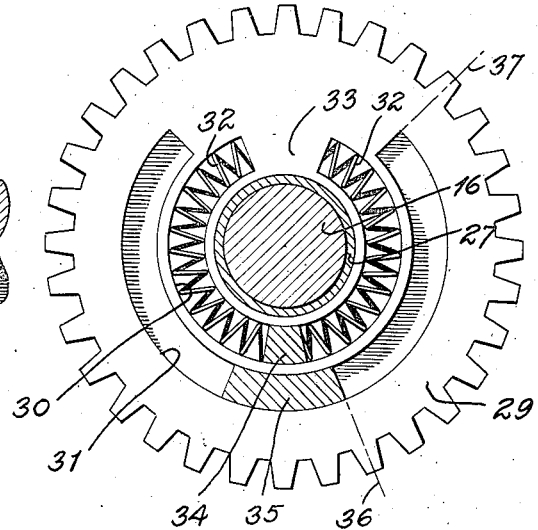
Inventor
Linden P. Carhart.

Patented Feb. 6, 1923.

1,443,976

UNITED STATES PATENT OFFICE.

LINDEN P. CARHART, OF BROOKLYN, NEW YORK.

TRANSMISSION.

Application filed August 25, 1920. Serial No. 405,975.

*To all whom it may concern:*

Be it known that I, LINDEN PETER CARHART, a citizen of the United States, and resident of the borough of Brooklyn, county of Kings, city and State of New York, have invented certain new and useful Improvements in Transmissions, of which the following is a specification.

This invention relates to improvements in transmissions and has for its principal object to provide a device which will eliminate much of the difficulty and noise usually accompanying the shifting of gears in making speed changes in motor vehicles.

Another object of the invention is to provide a means for causing the teeth of the stationary gear to be brought into position to mesh with the teeth of the sliding gear prior to the actual engagement of said teeth so as to eliminate the danger of stripping the gears or otherwise injuring the same.

As a more specific object the invention contemplates the provision of a means for bringing the speed of the jack shaft to the speed of the drive shaft prior to the actual engagement of the gears.

With these and other objects in view the invention consists of a novel construction, combination and arrangement of parts which will be fully set forth in the following specification, claimed and illustrated in the accompanying drawings in which:—

Fig. 2, is a sectional view on line 2—2 of Fig. 1,

Fig. 3, is an enlarged side view partly in section of one of the pinions constructed in accordance with this invention and Fig. 4, is a vertical sectional view on line 4—4 of Fig. 3.

Figure 1:
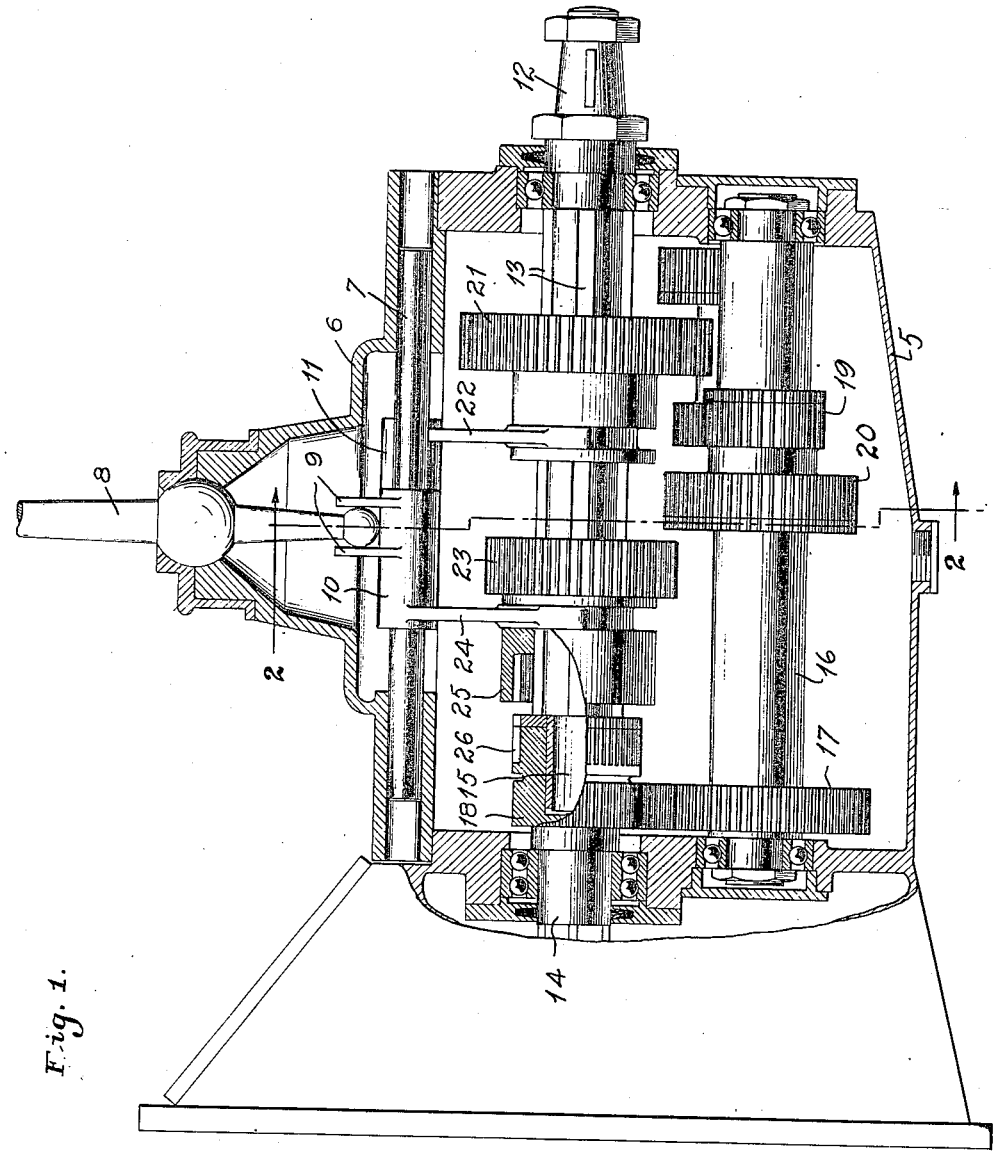
Fig. 1, is a longitudinal sectional view through a transmission illustrating this invention applied thereto.

Referring to the drawings in detail, the numeral 5 designates the transmission housing provided with the usual cover plate 6 in which the selecting rods 7 are mounted. The ordinary gear shifting lever 8 is mounted in the housing and the lower end of said lever is engaged between the upstanding lugs 9 of the sleeves 10 and 11 which are slidably mounted on the rods 7.

Mounted longitudinally on suitable ball bearings in the ends of the housing is the drive shaft 12 provided intermediate its ends with longitudinal feathers 13, the use of which will appear as the description proceeds. The power shaft 14 enters the forward end of the housing and is mounted on suitable ball bearings and its rear end is recessed as shown to receive the reduced end 15 of the drive shaft 12. A jack shaft 16 is mounted on suitable bearings directly beneath the drive and power shafts and the forward end of said jack is provided with a gear 17 which meshes with a pinion 18 carried by the power shaft 14. It will thus be seen that the jack shaft rotates continuously with the power shaft and the movement of said power shaft is controlled by the usual clutch not shown.

Fixed to the jack shaft 16 intermediate its ends are the pinions 19 and 20 which constitute the low and intermediate speed gears respectively. The reverse gear is illustrated in Fig. 1 in the rear of the jack shaft and is arranged in any desired manner. Slidably mounted on the drive shaft 12 intermediate its ends is the low speed and reverse sliding gear 21, the movements of which are controlled by a yoke 22 carried by the sleeve 11 previously described. It will thus be seen that as the sleeve 11 moves forward, the gear 21 will be brought into mesh with the gear 19 so that the power will be transmitted from the power shaft 14 through the jack shaft 16 and the gears 19 and 21 to the drive shaft 12 moving the vehicle forward at a low rate of speed.

Upon disengaging the gears 19 and 21 and bringing the intermediate speed gears 20 and 23 into mesh, it will be obvious that the speed of movement will be increased, it being understood that the movements of the gear 23 are controlled by the yoke 24 carried by the sleeve 10. Direct drive or high speed is obtained by the forward movement of the sleeve 10 which carries the yoke 24 forward and causes the clutch members 25 and 26 to mesh and in this position it will be seen that the power shaft 14 is locked with the drive shaft 12 so that no power is transmitted through the jack shaft.

In order that the teeth of the pinions carried by the power shaft may be protected against breakage and the noise usually accompanying the shifting of gears may be overcome, there has been provided the gear structure shown in Figs. 3 and 4. For the sake of illustration it is to be assumed that the gear illustrated in the figures above named, constitutes the intermediate gear on the jack shaft which is designated by the numeral 20. This gear 20 is formed with a forwardly extending hub or bearing member 27 provided at its extreme outer end with external screw threads on which the retaining ring 28 is secured. The disk 29 is rotatably mounted on the hub or bearing member 27 and is provided with peripheral teeth which match with the teeth on the gear as clearly shown in Fig. 3.

Formed on the inner face of said disk are grooves 30 and 31 and mounted in said groove 30 are coil springs 32, the inner ends of which butt against a web 33, while the outer ends engage a lug 34 which is formed integrally with the outer face of the gear 20 and is adapted to travel in the groove 30. A similar lug 35 is formed on the outer face of the gear 20 and is arranged to travel in the groove 31 and the ends of this lug are cut as shown in Fig. 4 to exactly match with the center of one of the gear teeth, the center line of which tooth is designated by the numeral 36. The opposite ends of the groove 31 are cut to exactly match with the centers of certain of the teeth on the disk, the center line of one of which is illustrated by the numeral 37 and it will be obvious that when the lug 35 travels around the groove until its end engages the end wall of the groove, the center lines of all of the teeth will exactly match so that the movement of the sliding gear into proper mesh with the pinion on the jack shaft will be facilitated.

In operation it will be seen that the sliding gear will first engage the disk and cause the same to rotate relatively to the gear against the compression of one of the springs 32 until the end of the lug 35 engages one of the end walls of the groove 31 and at which time the spring will be wholly compressed and the teeth of the disk will exactly match with the teeth on the gear. It has been found that beveling of the outer ends of the teeth on the disk as at 38 materially assists in the reduction of noise in the shifting of gears and while such beveling is desirable, it is not wholly essential. As soon as the gear is released it will be obvious that the compressed spring will shift the disk to the original position shown in Figs. 3 and 4, and the gear is again ready for operation. Obviously reverse motion of the gear will compress the opposite spring 32 and the same operation as above described will take place. It will thus be seen that the device will operate in a like manner whether used for driving forward or reverse, and as soon as the gears are thrown out of the mesh the springs will throw the disk 29 into a neutral or original position ready for a repeat operation. It will also be seen that the opposite springs 32 will be brought into play when it is desired to shift the gears from what is commonly known as high or third speed, back in through intermediate and first speed so that the danger of stripping the gear teeth and the noise usually accompanying such shifting will be overcome.

While in the foregoing there has been shown and described a preferred embodiment of this invention, it is to be understood that certain minor changes in the details of construction, combination and arrangement of parts may be resorted to without departing from the spirit and scope of the invention as claimed.

What is claimed is:—

1. A device of the class described comprising a gear, a plate associated therewith and rotatable with relation thereto, and teeth on the plate arranged to match with the teeth on the gear, and means to limit the rotation of the plate relatively to the gear at a point where the teeth align.

2. A device of the class described comprising a gear, a plate associated therewith and rotatable with relation thereto, teeth on the plate arranged to match with the teeth on the gear, means to limit the rotation of the plate relatively to the gear at a point where the teeth align, and means to return the plate to original position.

3. A device of the class described comprising a gear, a toothed plate rotatably associated therewith, and stops to cause the teeth on the gear and on the plate to match after a partial rotation of the plate.

4. A device of the class described comprising a gear, a toothed plate rotatably associated therewith, stops to cause the teeth on the gear on the plate to match after a partial rotation of the plate and means to return the plate to original position.

5. A device of the class described comprising a gear, a toothed plate rotatably associated therewith, stops to cause the teeth on the gear and on the plate to match after a partial rotation of the plate in either direction, and springs to return the plate to original position.

6. A device of the class described comprising a gear, a toothed plate rotatably mounted with relation thereto, said plate having an arcuate groove in the face adjacent the gear, and a stop on the gear projecting into the groove, the end walls of the groove aligning with the center lines of certain of the teeth on the plate and the ends of the stop aligning with the center lines of certain of the teeth on the gear whereby when the plate travels its full movement in either direction, the teeth of both the plate and gear will align.

7. A device of the class described comprising a gear, a toothed plate rotatably mounted with relation thereto, said plate having an arcuate groove in the face adjacent the gear, and a stop on the gear projecting into the groove, the end walls of the groove aligning with the center lines of certain of the teeth on the plate and the ends of the stop aligning with the center lines of certain of the teeth on the gear whereby when the plate travels its full movement in a forward or backward direction, the teeth of both the plate and gear will align, and means to return the plate and gear to original position.

8. A device of the class described comprising a gear, a toothed plate rotatably mounted with relation thereto, said plate having an arcuate groove in the face adjacent the gear, and a stop on the gear projecting into the groove, the ends walls of the groove aligning with the center lines of certain of the teeth on the plate and the ends of the stop aligning with the center lines of certain of the teeth on the gear when said plate revolves in either direction, a second groove in the plate, a second stop on the gear arranged to travel in the second mentioned groove and springs in said second groove arranged to abut the ends thereof and the ends of the second stop to return the plate to original position.

Signed in the city, county and State of New York, this 12th day of July, 1920.

LINDEN P. CARHART.